United States Patent [19]

Lien et al.

[11] Patent Number: 4,855,935

[45] Date of Patent: Aug. 8, 1989

[54] METHOD AND APPARATUS FOR RENDERING VECTORS USING BRESENHAM PARAMETERS

[75] Inventors: Sheue-Ling Lien, Mountain View; Michael J. Shantz, Sunnyvale; Jerald R. Evans, Mountain View; Serdar Ergene, San Jose; Susan E. Carrie, Sunnyvale, all of Calif.

[73] Assignee: Sun Microsystems, Inc., Mountain View, Calif.

[21] Appl. No.: 47,693

[22] Filed: May 8, 1987

[51] Int. Cl.[4] .............................................. G06F 15/72

[52] U.S. Cl. .................................... 364/521; 340/728; 340/739

[58] Field of Search ................ 364/518, 521; 340/744, 340/747, 709, 728, 732, 739, 703, 727

[56] References Cited

U.S. PATENT DOCUMENTS

| | | | |
|---|---|---|---|
| 4,386,349 | 5/1983 | Granberg et al. | 340/723 |
| 4,586,037 | 4/1986 | Rosener et al. | 340/728 |
| 4,648,049 | 3/1987 | Dines et al. | 364/521 |
| 4,660,028 | 4/1987 | Yu | 340/739 |
| 4,736,330 | 4/1988 | Capowski | 364/518 |
| 4,745,575 | 5/1988 | Hawes | 364/900 |

*Primary Examiner*—David L. Clark
*Assistant Examiner*—Randy W. Lacasse
*Attorney, Agent, or Firm*—Blakely, Sokoloff, Taylor & Zafman

[57] ABSTRACT

An adaptive forward differencing apparatus wherein, when rendering curves, calculated x, y values are increased or decreased in order to create values which correspond to the next pixel of the display CRT, such that curves of substantially one pixel increments are continuously and uniformly generated. The apparatus of the present invention also provides circuitry for generating coordinates of display elements which approximate an ideal vector and to define curves, vectors or objects within maximum and minimum coordinates of the CRT display. The present invention also provides efficient circuitry for computing the value of 1/w of the homogenous coordinate w.

2 Claims, 6 Drawing Sheets

ARC LENGTH OUTPUT TO PAINT SECTION 150

METHOD AND APPARATUS FOR RENDERING VECTORS USING BRESENHAM PARAMETERS

FIELD OF THE INVENTION

The present invention relates to methods and apparatus for generating images on a cathode ray tube ("CRT") or other display device. More particularly, the present invention relates to methods and apparatus for the accurate rendering of higher order curves and curved surfaces, vectors or objects on a CRT or other display.

BACKGROUND OF THE INVENTION

In many computer systems, it is quite common to represent and convey information to a user through digital images. These images may take a variety of forms, such as for example, alphanumeric characters, cartesian graphs, and other pictorial representations. In many applications, the digital images are conveyed to a user on a display device, such as a raster scan video monitor, printer or the like. Typically, the images to be displayed are stored in digital form, manipulated, and then displayed.

Parametric curves and curved surfaces are common functions which are used in the computer generation of surfaces and objects on a display such as, for example, in mechanical computer aided design ("CAD") applications. Since high speed hardware capable of rendering vectors and polygons is known in the prior art, high speed rendering of curved lines and curved surfaces is usually done by subdividing and rendering them on a CRT as a plurality of straight-lines or planar polygons. (For a more thorough understanding of prior art methods for rendering curves and/or surfaces, see: Bishop, G. and Weimer, D., "Fast Phong Shading" pp 103-106 *Computer Graphics* Vol. 20, Number 4, August, 1986; Foley, J. D. and Van Dam, A., 1983 *Fundamentals of Interactive Computer Graphics,* Addison Wesley, Reading, MA.; Gouraud, H., June 1971. "Continuous Shading of Curved Surfaces." *IEEE Transactions on Computers,* Vol. 20, No. 6, pp 623-628; Swanson, R. and Thayer, L., "A Fast Shaded-Polygon Renderer," *Computer Graphics,* Vol. 20, No. 4, pp 95-101, August, 1986.).

However, with respect to the rendering of higher order curves and surfaces, prior art systems employ recursive subdivision methods which are expensive to implement in computer hardware because of the high speed stack memory requirements.

The present invention employs an adaptive forward difference ("AFD") technique which overcomes the problems associated with the prior art, yet requires relatively simple and inexpensive circuitry using ordinary forward differencing (advancing along a parametric curve or surface in constant parameter increments), as well as a new adaptive method superior to prior art adaptive subdivision methods of recursively dividing the object until the resulting pieces are smaller than one pixel. The present invention adapts the forward difference parameter increment so as to advance along the curve or surface with a step size (i.e., the distance between the previously drawn pixel location and the current pixel location of the curve or surface being rendered) which is approximately equal to the distance between two adjacent pixels (hereinafter referred to as a "single or one pixel increment"). This adaptation is performed by transforming the equation of the curve to an identical curve with different parameterization, such that the step size is increased or decreased such that the curve proceeds in substantially uniform increments from one pixel to the next. AFD differs from prior art recursive subdivision methods for rendering curves because it does not require manipulation of the complex prior art stack memory circuitry and therefore is simpler and more efficient. Further, the rendering of the curve, curved surface or object yielded by the present invention is more accurate than it would otherwise be if rendered by the prior art ordinary forward differencing method with piece-wise, straight-line or planar polygon approximation.

SUMMARY OF THE INVENTION

The present invention overcomes the obstacles and drawbacks contained in the prior art through an adaptive forward differencing apparatus for rendering a curve on a display device (such as a "CRT") by actuating display elements defining the curve. The apparatus of the present invention comprises a means for receiving a plurality of data points representative of the display elements which define the images and a means for incrementally rendering the curve in substantially uniform single pixel steps.

The means for incrementally rendering the image in substantially uniform single pixel steps includes X, Y, Z and W Adaptive Forward Differencing Unit "AFDU" circuits for calculating x, y, z and w for a point in homogenous coordinates. The W AFDU circuit is coupled to a 1/w circuit that produces the reciprocal 1/w of the homogenous coordinate w. The output of the 1/w circuit is multiplied by the x, y, z coordinates to yield the rational cubics x/w, y/w and z/w. The AFDU circuits are also coupled to a pixel filter circuit which, in cooperation with the AFDU circuits, implements the AFD technique of the present invention by reparameterizing the x, y, z and w cubic functions such that a curve is generated in substantially uniform one pixel sized increments.

The pixel filter circuit of the present invention compares the current pixel location with the previous pixel location calculated by the AFDU circuits and, if the current x, y pixel location of the display means is greater than a one pixel increment away from the previously defined x, y pixel location, instructs the X, Y, Z and W AFDU circuits to reduce the step size of the curve being rendered.

Similarly, if the calculated x and y increments of the curve being rendered are less than a predetermined portion (i.e. 0.5 pixels), the pixel filter instructs the X, Y, Z and W AFDU circuits to increase the step size of the curve being rendered.

When rendering vectors, the AFDU circuit of the present invention implements the Bresenham algorithm using many of the same circuit components utilized by the Adaptive Forward Difference method. The present invention also provides a means for defining clipping regions on a CRT display, a means for mapping imagery onto curved surfaces and onto curves, and a means for shading and trimming curved surfaces. Other features and advantages will become apparent after a reading of the foregoing specification.

DETAILED DESCRIPTION OF THE INVENTION

The present invention discloses apparatus and methods having particular application for use in a computer system used for the graphic display of images. Although the present invention is described with reference to specific circuits, block diagrams, signals, algorithms, etc., it will be appreciated by one of ordinary skill in the art that such details are disclosed simply to provide a more thorough understanding of the present invention. It will therefore be apparent to one skilled in the art that the present invention may be practiced without these specific details. In other instances, well known circuits are shown in block diagram form in order not to obscure the present invention unnecessarily.

Figure 1:
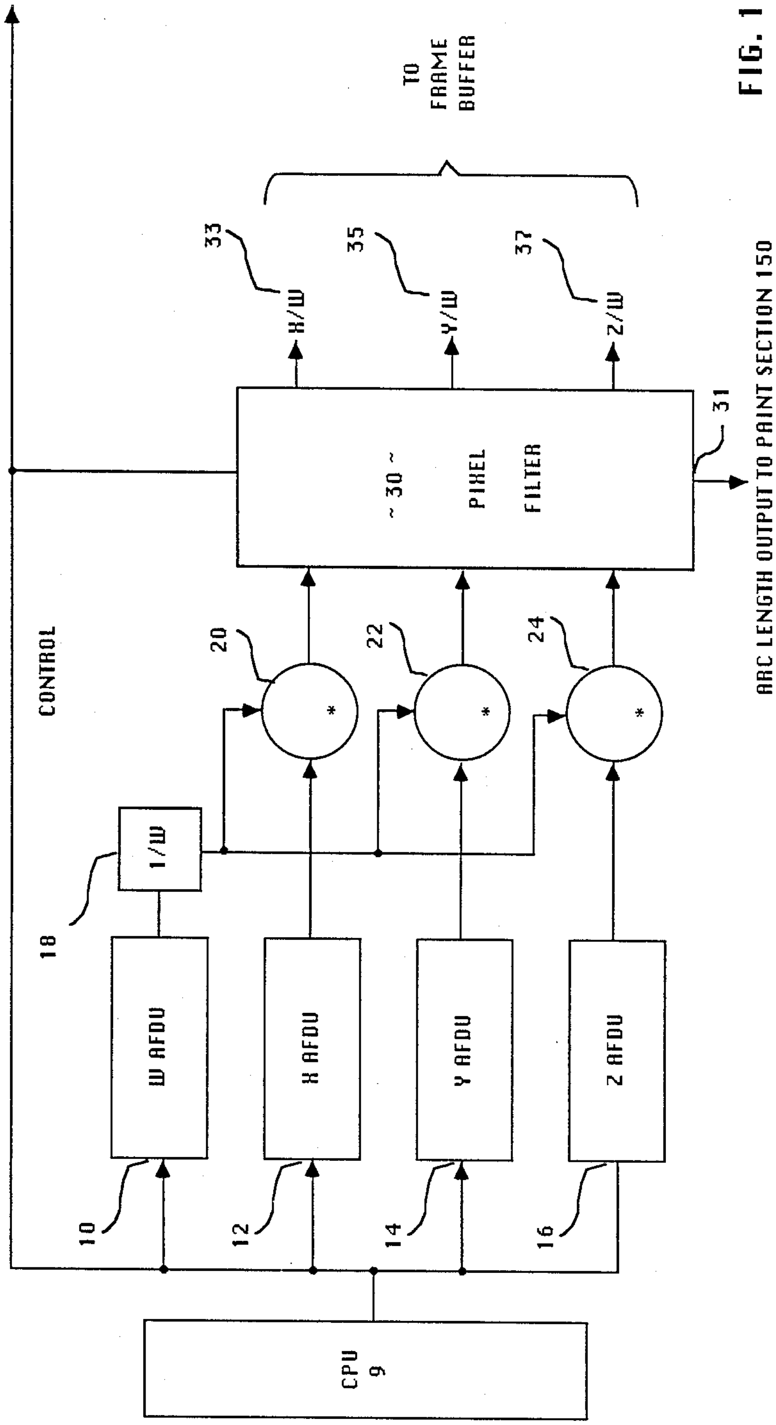
FIG. 1 illustrates an overall block diagram view of the present invention.

In FIG. 1 there is shown an overall block diagram view of the present invention. In order to define images on a CRT display or other display device, it is necessary to manipulate data at a high speed in order to select the pixels of a CRT display that define the curve, curved surface, vector or image that is desired to be displayed. It is well known in the art that the location of each point to be displayed on a CRT often is represented by digital values stored in a memory device which correspond to x, y, z and w homogenous coordinates.

The coefficients of the equations describing curves to be rendered by the circuit of FIG. 1 are calculated and supplied by a CPU 9 and are transmitted to the W, X, Y and Z Adaptive Forward Differencing Unit ("AFDU") circuits 10, 12, 14 and 16 which, in response, output x, y, w and z coordinates, respectively, for each pixel to be drawn on the display. The w coordinate outputted by the W AFDU circuit 10 is coupled to the 1/w circuit 18 which, in turn, outputs the current value of 1/w. The x, y and z coordinates are divided by the homogenous coordinate w (i.e. multiplied by the current 1/w value in order to obtain the ratio of two cubic functions), by the 1/w circuit 18 and the three multipliers 20, 22, and 24.

More specifically, the X AFDU circuit 12 outputs the current x coordinate to a multiplier 20, wherein it is multiplied by the corresponding 1/w value outputted by the 1/w circuit 18, such that a current x/w value is supplied to pixel filter 30. In a similar fashion, y/w and z/w are supplied to pixel filter 30, respectively, by W, Y, and Z AFDU circuits 10, 14 and 16, 1/w circuit 18 and by the multipliers 22 and 24. In this fashion the x, y, and z coordinates of the rational cubic functions are inputted to pixel filter 30 and used to select the pixels defining images of the rational cubic functions on a CRT.

The pixel filter 30 of FIG. 1 compares the current x, y and z pixel coordinates which are fed thereto by multipliers 20, 22 and 24, with the x, y and z pixel coordinates which were fed to the pixel filter 30 one clock cycle previously and instructs the W, X, Y and Z AFDU circuits to "adjust up" (i.e., advance the curve or curved surface in larger increments) by multiplying the parameter t by two or to "adjust down" (i.e., advance the curve or curved surface in smaller increments) by dividing the parameter t by 2, or to "step forward" to the next pixel such that the x, y and z coordinates outputted by pixel filter 30 advance the curve being displayed on the CRT substantially in single pixel increments. The adjustment technique will later be more fully described.

Figure 6:
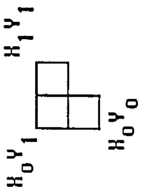
FIGS. 6 and 6*a* illustrate an aspect of the present invention relating to the enabling of pixels on a display.
Figure 6A:
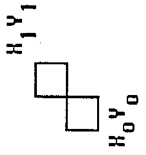

The pixel filter 30 also detects and replaces "elbows" [wherein a curve section having, for example, the coordinates $(x_0, y_0)$, $(x_0, y_1)$ and $x_1, y_1)$ (see FIG. 6), is replaced with a curve section having the coordinates $(x_0, y_0)$ and $(x_1, y_1)$ (See FIG. 6*a*).] This is done to improve the appearance of the rendered curve by eliminating the corner pixel (i.e. pixel $x_0$, $y_1$ shown in FIG. 6).

The pixel filter 30 is coupled, at outputs 33, 35, and 37, to a frame buffer (not shown) which, in turn, is coupled to a CRT display (also not shown) or other appropriate display device, for defining images by enabling, or writing a color value at the pixels defined by the pixel coordinates outputted by pixel filter 30 at outputs 33, 35 and 37.

Arc length output 31 of pixel filter 30 is coupled to a paint section 150 (not shown) which paints pixels in accordance with the arc length value outputted by pixel filter 30 at output 31. The arc length value is employed in the drawing of textured (dashed, dotted, etc.) lines and surfaces. The drawing of textured lines and surfaces does not, however, form an essential part of the instant invention as described and claimed herein and a more detailed explanation thereof is not, therefore, necessary.

Figure 2:
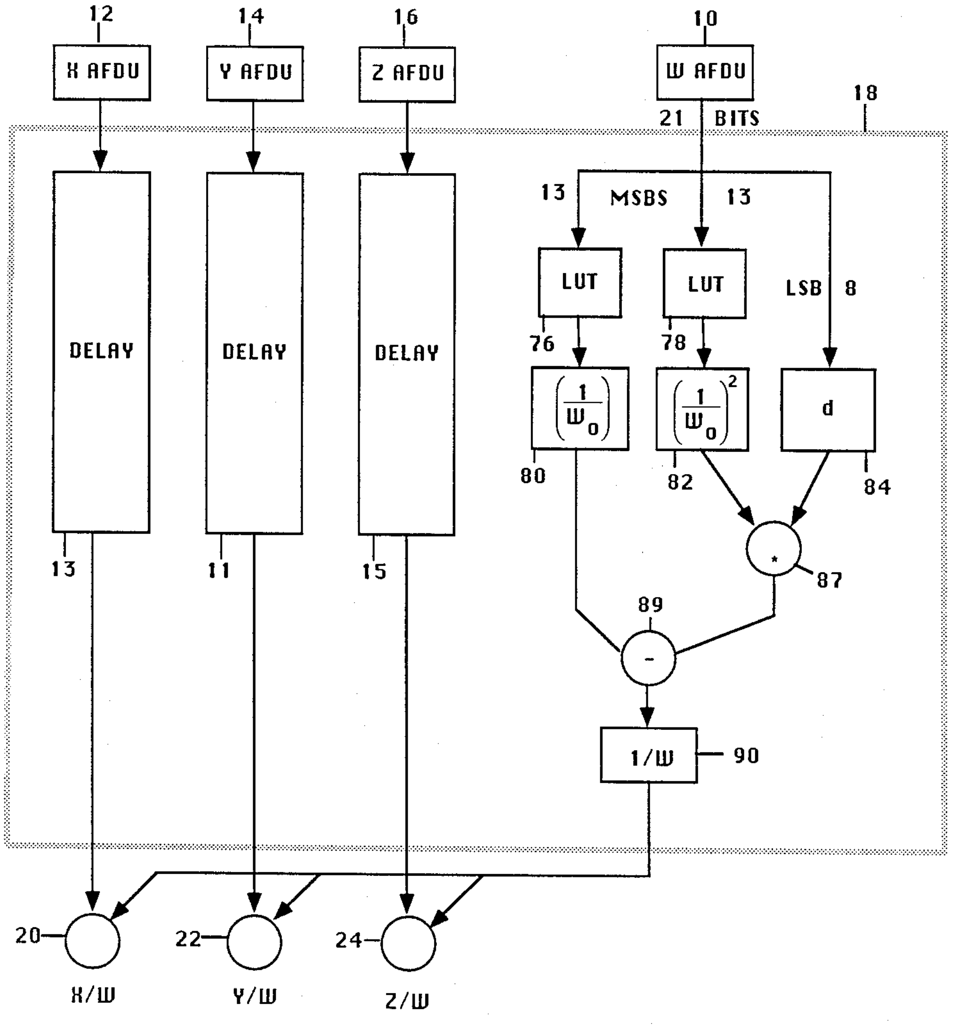
FIG. 2 is a block diagram of the 1/w circuit of FIG. 1.

In FIG. 2 there is shown an exploded view of the 1/w circuit 18 of FIG. 1. The 1/w circuit 18 of FIG. 1 is an advancement over prior art circuits for obtaining the reciprocal of w in that the 1/w circuit 18 of the present invention yields the reciprocal of w faster, with less computational overhead and less latency than comparable prior art circuits.

Prior art 1/w circuits typically use a Newton iteration algorithm employing a single look-up table for the initial approximation of the reciprocal of w. These prior methods require a large multiplier and take several clock cycles to obtain a result. In direct contrast, the present invention requires only one clock cycle for the iteration computation, thereby greatly reducing latency as compared with prior art methods. (For a more complete description of prior art methods for division through divisor reciprocation see: "Computer Arithmetic", Kai Hwang, pp 259–264, John Wiley & Sons, New York, N.Y., 1979). To achieve the above-described superior results, the present invention uses a truncated Taylor series approximation utilizing two small look-up tables 76 and 78 (i.e. in the preferred embodiment, table 76 has 8K entries and 20 bit output while table 78 has 8 bit output 8k entries and minor computation hardware to implement the same in order to derive an approximation of 1/w without the costly, slower computations required by the prior art).

As is well known in the art, the Taylor series approximation is used to derive the reciprocal of the homogenous coordinate w. The Taylor series approximation states:

$$1/w \approx (1/w_0)[1-d/w_0+(d/w_0)^2-(d/w_0)^3+(d/w_0)^4+(d/w_0)^5 \ldots]$$

where $w_0$ represents a pre-determined quantity of the most significant bits of the w value and where d represents a predetermined quantity of the least significant bits of the w value. It has been discovered that truncating the above listed Taylor series approximation to include only the first two terms thereof (i.e. $1/w_0-d(1/w_0^2)$) renders a 1/w value which is sufficiently accurate for purposes of obtaining the rational cubic functions x/w, y/w and z/w for use in the rendering of images.

The w value outputted by W AFDU circuit 10, in the preferred embodiment of the present invention, comprises 21 bits. The 13 most significant bits (termed herein as "$w_0$") of that 21 bit value are supplied to look-up tables 76 and 78. Look-up table 76 outputs the reciprocal ($1/w_0$) of the thirteen bit value inputted thereto to register 80. Similarly, look-up table 78 outputs a $(1/w_0)^2$ value corresponding to the thirteen most significant bits supplied thereto, to register 82. The eight least significant bits of the 21 bit w value are supplied to an 8-bit delay register 84, which merely delays the eight least significant bits a length of time sufficient to allow the outputting of $(1/w_0)^2$ by register 82, such that multiplier 87 multiplies the eight least significant bits, (termed herein as "d"), times the contents of register 82 such that multiplier 87 outputs $d(1/w_0)^2$ to subtracter 89 where $d(1/w_0)^2$ is subtracted from $(1/w_0)$ in order to produce at register 90 $1/w_0-d(1/w_0)^2$. As stated, $1/w_0-d(1/w_0)^2 \approx 1/w$. Register 90, in turn, outputs the value 1/w to multipliers 20, 22 and 24 as previously discussed with respect to FIG. 1. Delays 13, 11 and 15 are present to ensure that the x, y and z coordinates outputted, respectively, by X, Y and Z AFDU circuits 12, 14 and 16 arrive at multipliers 20, 22 and 24 substantially coincident with the calculated corresponding 1/w value outputted by Register 90.

Multiplier 87 is an 8 bit by 8 bit multiplier. $(1/w_0)^2$ and d are 8 bit terms and are therefore propagated through to subtracter 89 and thus register 90 in only one clock cycle.

From the above discussion, it will be appreciated that by employing the two look-up tables 76 and 78 which yield, respectively, $1/w_0$ and $(1/w_0)^2$ and computing those values to produce 1/w as previously described, the present invention avoids the long latency producing computations which were previously required in the aforedescribed prior art devices, thereby increasing the speed with which 1/w is derived. In the preferred embodiment of the 1/w circuit, 18 produces a 1/w value which has 20 significant bits, however, it will be appreciated that more or less bits may be used as long as the values stored in the look-up tables employed ar adjusted accordingly.

Figure 3:
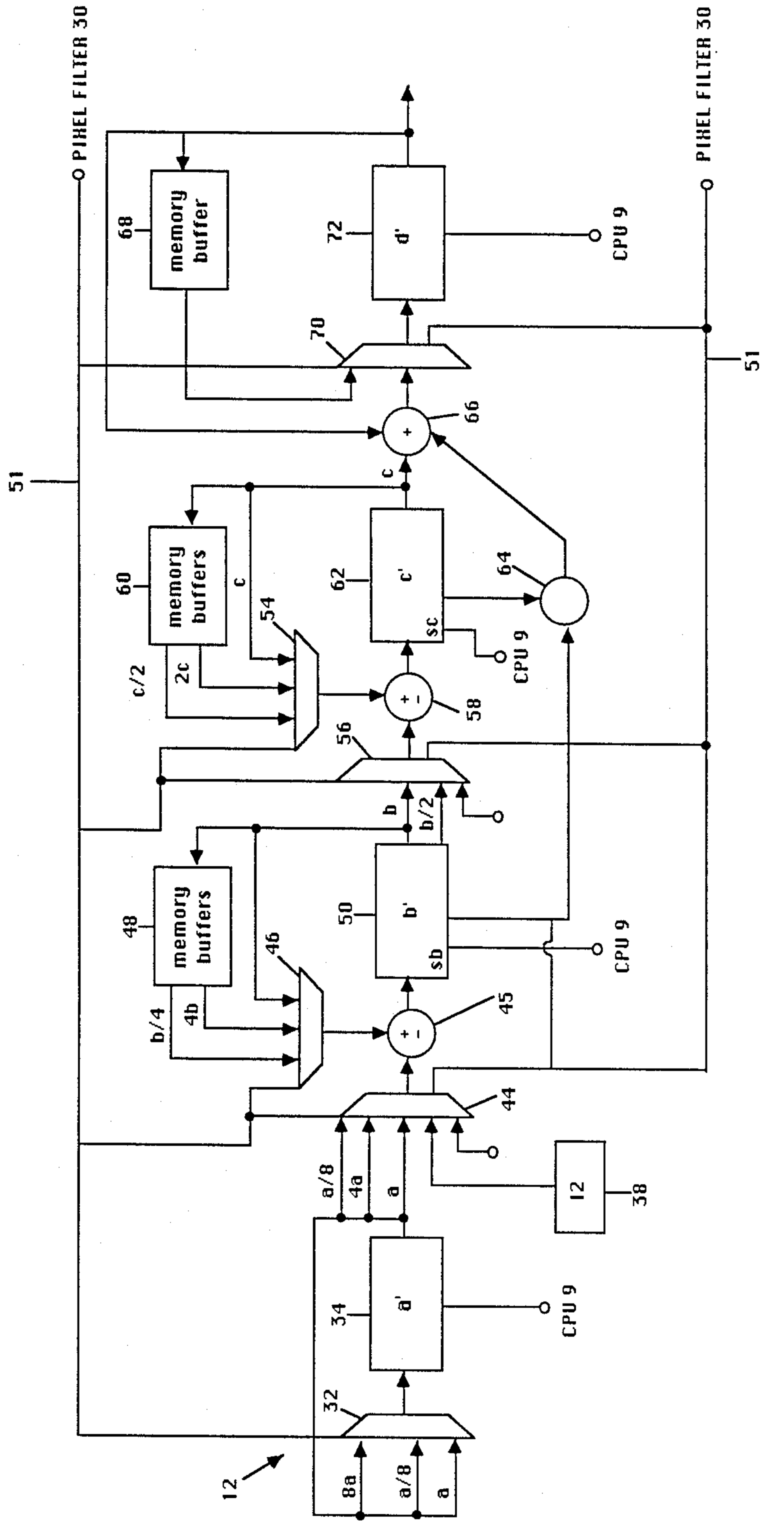
FIG. 3 is an exploded block diagram view of the X AFDU circuit of FIG. 1.

In FIG. 3 there is shown an exploded view of the X AFDU circuit 12 of FIG. 1. Y, Z and W AFDU circuits 14, 16 and 10 are identical in circuitry to the X AFDU circuit 12, and therefore a thorough understanding of X AFDU circuit 12 will also fully convey the circuitry and operation of Y, Z and W AFDU circuits 10, 14 and 16.

Each AFDU circuit calculates a parametric cubic function f(t) represented as:

$$f(t)=aB_3(t)+bB_2(t)+cB_1(t)+dB_0(t). \quad (1)$$

For each x, y, z and w coordinate the parametric cubic function f is:

$$x(t)=a_xB_3+b_xB_2+c_xB_1+d_xB_0$$

$$y(t)=a_yB_3+b_yB_2+c_yB_1+d_yB_0$$

$$z(t)=a_zB_3+b_zB_2+c_zB_1+d_zB_0$$

$$w(t)=a_wB_3+b_wB_2+c_wB_1+d_wB_0$$

The above functions $B_3(t)$, $B_2(t)$, $B_1(t)$ and $B_0(t)$ are forward difference basis functions which differ from one another as t varies from 0 to 1 along a curve. The dt step size for t is automatically adjusted so that the curve increments in approximately one pixel steps as explained below. The four forward difference basis functions $B_3$, $B_2$, $B_1$ and $B_0$ are listed below:

$$B_3(t) = \frac{t^3 - 3t^2 + 2t}{6} \quad (2)$$

$$B_2(t) = \frac{t^2 - t}{2} \quad (3)$$

$$B_1(t)=t \quad (4)$$

$$B_0(t)=1 \quad (5)$$

The above cubic functions x(t), y(t), z(t), w(t) are calculated separately by each AFDU circuit. The four coefficients a, b, c, and d which describe a cubic curve are loaded into the four coefficient registers 34, 50, 62 and 72 of each AFDU circuit at initialization by the CPU 9. At each clock cycle, the parameter t increases by dt and the four coefficients are updated to a', b', c', d' while the four AFDU circuits 10, 12, 14 and 16 generate the coordinates which correspond to a particular pixel on the CRT display.

If the x, y coordinate currently calculated by the X and Y AFDU circuits 12 and 14 define a pixel location on the CRT display which is more than a single pixel increment from the previously defined pixel, then pixel filter 30 instructs each AFDU circuit to divide dt by two (adjust down), thereby reducing the x, y increments so that at each clock cycle each AFDU circuit outputs coordinates which define pixels along the curve in substantially single pixel increments. In a similar fashion, if the x, y address step is less than a ½ pixel increment from the previously defined pixel, then dt is doubled (adjusted up) to increase the change in the x, y coordinates such that again a substantially one pixel step is incremented at each clock cycle. To reduce dt by half, the cubic functions x(t), y(t), z(t), w(t) are transformed as follows:

$$x'(t)=x(t/2)=a'_xB_3+b'_xB_2+c'_xB_1+d'_xB_0$$

$$y'(t)=y(t/2)=a'_yB_3+b'_yB_2+c'_yB_1+d'_yB_0$$

$$z'(t)=z(t/2)=a'_zB_3+b'_zB_2+c'_zB_1+d'_zB_0$$

$$w'(t)=w(t/2)=a'_wB_3+b'_wB_2+c'_wB_1+d'_wB_0$$

The coefficients of the transformed set of cubic functions are given by:

$$a'=a/8$$

$$b'=b/4-a/8$$

$$c'=c/2-b/8+a/16$$

$$d'=d$$

In order to double dt, the coordinate cubic functions are transformed by:

$$x'(t)=x(2t)$$

$$y'(t)=y(2t)$$

$$z'(t)=z(2t)$$

$$w'(t)=w(2t)$$

In the case of doubling dt, the present invention utilizes the following coefficient transformation:

$$a'=8a$$

$$b'=4b+4a$$

$$c'=2c+b$$

$$d'=d$$

If the current step size being used by the AFDU circuits is correct, (i.e. substantially a one pixel increment), then the AFDU circuits generate coordinates corresponding to a new pixel and step forward to that pixel by calculating the following transformation:

$$x'(t)=x(t+1)$$

$$y'(t)=y(t+1)$$

$$z'(t)=z(t+1)$$

$$w'(t)=w(t+1)$$

The corresponding coefficient transformation for an increment of one pixel is:

$$a'=a$$

$$b'=b+a$$

$$c'=c+b$$

$$d'=d+c$$

Returning to FIG. 3, in order to implement the above transformations (adjust up, adjust down, or forward step) the pixel filter 30 sends control signals to multiplexors 32, 44, 46, 54, 56 and 70 to select an appropriate input into, respectively, adder/subtracter 45, 58, and 66. These multiplexors select the appropriate transformed values for the a', b', c' and d' coefficients. As stated, the values a, b, c and d are initially loaded by the CPU 9 into registers 34, 50, 62 and 72. New coefficient values corresponding to the desired pixel location are updated and loaded into registers 34, 50, 62 and 72 at each clock cycle, thereby incrementally computing the parametric function $x(t)=a_xB_3+b_xB_2+c_xB_1+d_xB_0$. If the x, y and w coordinates outputted by AFDU circuits 12, 10, and 14 correspond to a pixel location which is greater than a one pixel increment from the previously defined pixel, the coefficients of a', b', c' and d' are selected as $a'=a/8$, $b'=b/4-a/8$, $c'=c/2-b/8+a/16$ and d'=d. The $8a$ input to multiplexor 32 is wired with a left shift of 3 bits to give the value $8a$ for use in the above listed equations. Similarly, the input a/8 is right shifted three bits to obtain the value a/8.

In general, dividing or multiplying by an integer power of two is accomplished by a hard wired right or left shift. The coefficients for an adjust down operation ar obtained in two clock cycles as follows: First clock cycle, pixel filter 30 places control signals on bus 51, which cause multiplexor 32 to select A/8, multiplexor 4 to select A/8, multiplexor 46 to select B/4, multiplexor 56 to select 0, and multiplexor 54 to select C/2. At the end of this clock cycle, $A'=A/8$, $B'=B/4-A/8$, and $C'=C/2$. During the second clock cycle, pixel filter 30 places control signals on bus 51 which cause multiplexor 32 to select a, multiplexor 44 to select 0, multiplexor 46 to select b, multiplexor 56 to select B/2, and multiplexor 54 to select c. At the end of this clock cycle, the result of the two clock cycle operations is $A'=A/8$, $B'=B/4-A/8$, $C'=C/2-(B/4-A/8)/2$. Adders/subtracters 45 and 58, as well as adder 66, are controlled by pixel filter 30 in order to perform addition or subtraction operations necessary for the above-described transformations.

Similarly, as previously discussed, when a pixel increment calculated by the X AFDU circuit 12 is less than 0.5 of a pixel step, the coefficients a, b, c and d are transformed by: $a'=8a$, $b'=4b+4a$, $c'=2c+b$ and d'=d. To perform these transformations, appropriate control signals from pixel filter 30 are asserted at multiplexors 32, 44, 46, 54, 56 and 70 such that the 8$a$, 4$a$, 4$b$, and 2$c$ are clocked into the corresponding registers in conjunction with adder/subtracters 45, 58 and 66.

Alternatively, if the AFDU circuit calculates an x increment between 0.5 and 1 and a y increment between 0.5 and 1, then the a, b, c and d coefficients are selected by multiplexors 32, 44, 46, 54, 56 and 70 by appropriate control signals asserted by the pixel filter 30 such that register 50 is updated by $b'=b+a$, register 62 is updated by $c'=c+b$, d register 72 by $d'=d+c$ and a register 34 remains unchanged. It will be appreciated that only the outputs from AFDU circuits X, Y, and W are used by the pixel filter to control the adjustment of all four AFDU circuits since the x/w and y/w coordinates sufficiently define pixel location. In such a fashion, the AFDU circuits 10, 12 and 14, in cooperation with the 1/w circuit 18, multipliers 20, 22, 24 and pixel filter 30, ensure that the curves rendered are incremented in substantially one pixel increments.

Memory buffers 48, 60 and 68 are used to store a sequence of the last N b, c and d values, respectively, so that the properly delayed b coordinate values associated with the pixel filter 30 control signal are used. This is necessary because pixel filter 30 determines control decisions several clocks after the AFDU generates the pixel addresses. Memory buffers 48, 60 and 68 store a sequence of values so that the b value having a delay equal to the number of clocks between the AFDU and the pixel filter is used to compute b'. No memory buffer is necessary for register 34 since "a" does not change during a forward step AFDU operation.

Another important aspect of the present invention is hereinafter described.

A critical problem which typically occurs in prior art forward differencing methods for rendering curves is overflow or overloading of the registers used for storing the integer of the coefficient values of the parametric cubic function used for calculating the curve. Of course, if a register used for storing a coefficient reaches capacity and overflows, accurate calculation of the parametric cubic function will become impossible. The present invention provides a unique method and apparatus for preventing such overflow from occuring, thereby ensuring continuous accurate implementation of the parametric cubic function for rendering the curve. The following is an explanation of this aspect of the present invention.

Figure 7:
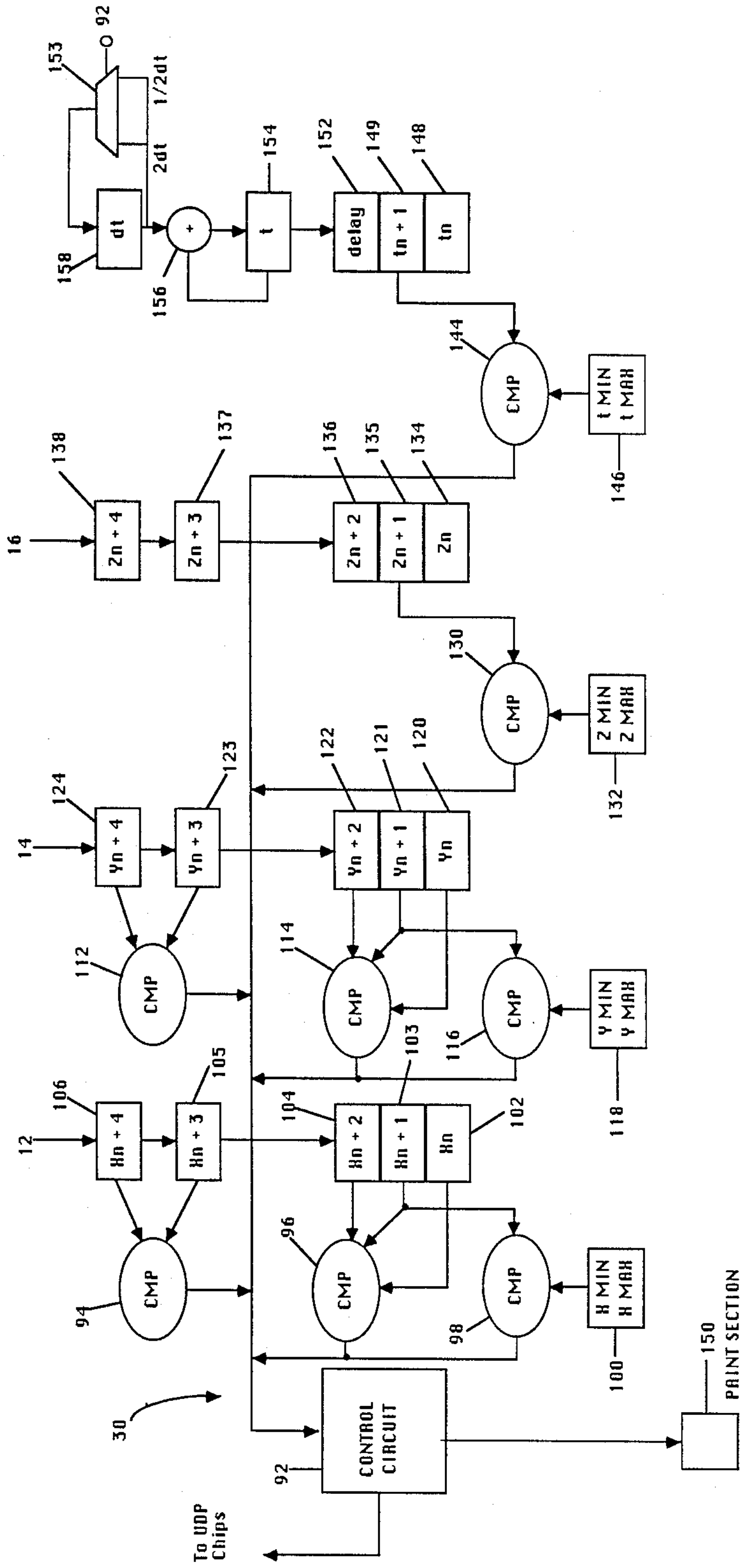
FIG. 7 is an exploded view of the pixel filter circuit of FIG. 1.

In the present embodiment, registers 34 and 50 of FIG. 3 have a capacity for storage of three-integer bits, which, for purposes of convenience, will herein be labelled, respectively, $a_1$, $a_2$, $a_3$ and $b_1$, $b_2$ and $b_3$. $a_1$ and $b_1$ are the most significant integer bits. The most significant fractional bit of register 34 will herein be labeled $a_4$. Since Register 62 accumulates, on a forward step, the contents of register 50, it has, in the preferred embodiment, a storage capacity of more than three integer bits. The most significant integer bit of register 62 is termed herein as $c_1$. Registers 34, 50 and 62 are coupled to a control circuit 92 of FIG. 7 (a detailed description of the operation of pixel filter 30 and control circuit 92 as shown in FIG. 7 will later be described more fully) within the pixel filter 30 and outputs thereto bits which indicate to the control circuit 92 that the integer storage capacity of registers 34, 50 and/or 62 are in overflow or could possibly overflow with the next calculation. Below are listed the conditions in which registers 34 and 50 send a bit (termed herein as the "warning bit") which instructs the control circuit 92 of the pixel filter 30 that the next adjust up will result in an overflow of the integer storage capacity of registers 34 and 50.

A warning bit is asserted if:

$a_1 \neq$ the sign bit (sb) of register 34 or;
$a_2 \neq$ sign bit of register 34 or;
$a_3 \neq$ sign bit of register 34 or;
$a_4 \neq$ sign bit of register 34 or;
$b_1 \neq$ sign bit of register 50 or;
$b_2 \neq$ sign bit of register 50 or;
$b_3 \neq$ sign bit of register 50.

The pixel filter 30, as stated, sends control signals to multiplexors 32, 44, 46, 54 and 70, which instruct each ADFU circuit to adjust up, adjust down or step forward to the next pixel. When a warning bit is asserted at control circuit 92 of pixel filter 30, pixel filter 30 instructs each AFDU unit to step forward to the next pixel (instead of adjust up) when an adjust up is indicated by calculations made by the pixel filter 30. Adjust down and forward steps are not affected by assertion of the warning bits. Instructing each AFDU circuit to step forward does not cause registers 34 and 50 to overflow, since stepping forward does not require multiplication of the coefficient "a"term by 8 or multiplication of the "b" term by 4. The AFDU circuits are thus prevented from adjusting up until the curve is completed or until the warning bit is de-asserted.

Similarly, the bit which instructs pixel filter 30 that the integer storage capacity of registers 34, 50 and 62 will overflow with next adjust up or forward step (termed herein as the "overflow bit") is asserted whenever $a_1 \neq$ sign bit of a; $b_1 \neq$ sign bit of b or $c_1 \neq$ sign bit of c. When the overflow bit is asserted it instructs control circuit 92 to assert control signals to the AFDU multiplexors which instruct each AFDU circuit to adjust down, whether or not an adjust up or a step forward is indicated by the calculations made by the pixel filter 30. An adjust down relieves the overflow problem in registers 34, 50 and 62, thereby causing de-assertion of the overflow bit. The sign bit of registers 34, 50 and 62 is used so that the warning bit and overflow bits will be asserted if the integer portion of the number stored therein is getting too large in the positive direction or too small in the negative direction in two's complement representation.

It will be appreciated to one skilled in the art that registers having a storage capacity for more or less integer values may be used in place of registers 34 and 50 without departing from the concepts of the present invention herein disclosed.

It will also be appreciated from the above description that a critical problem which occurs in prior art forward differencing circuits (i.e. overflow of the curve rendering units) is hereby avoided by the above described features o the present invention.

Figure 4:
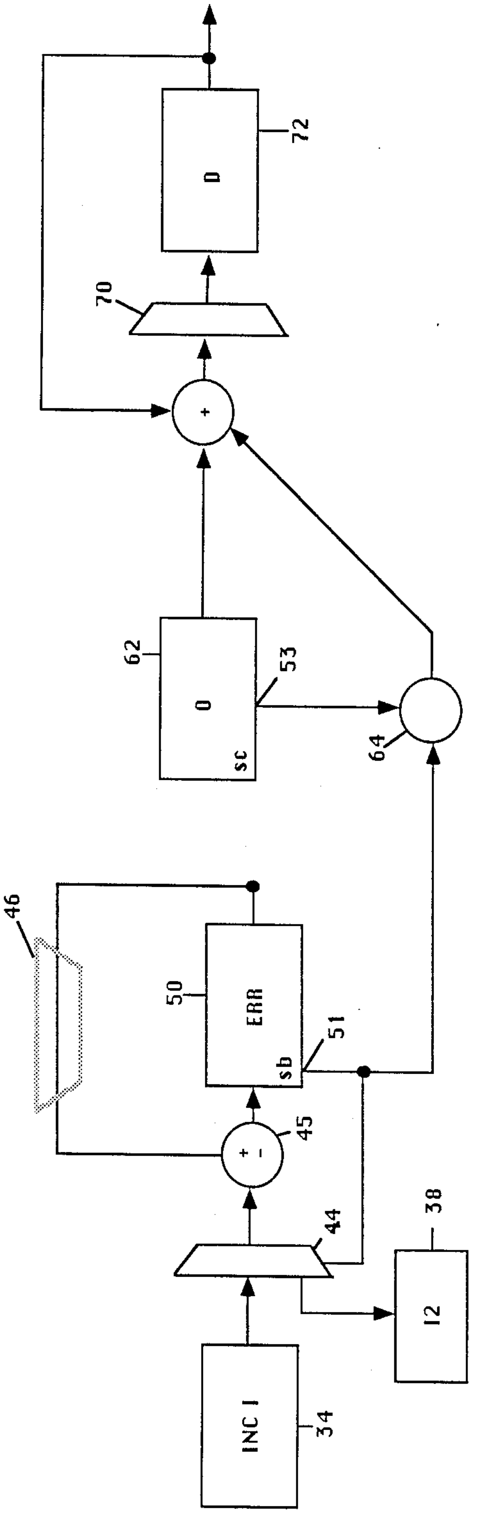
FIG. 4 illustrates a portion of the circuit shown in FIG. 3 which is used in rendering vectors.
Figure 5:
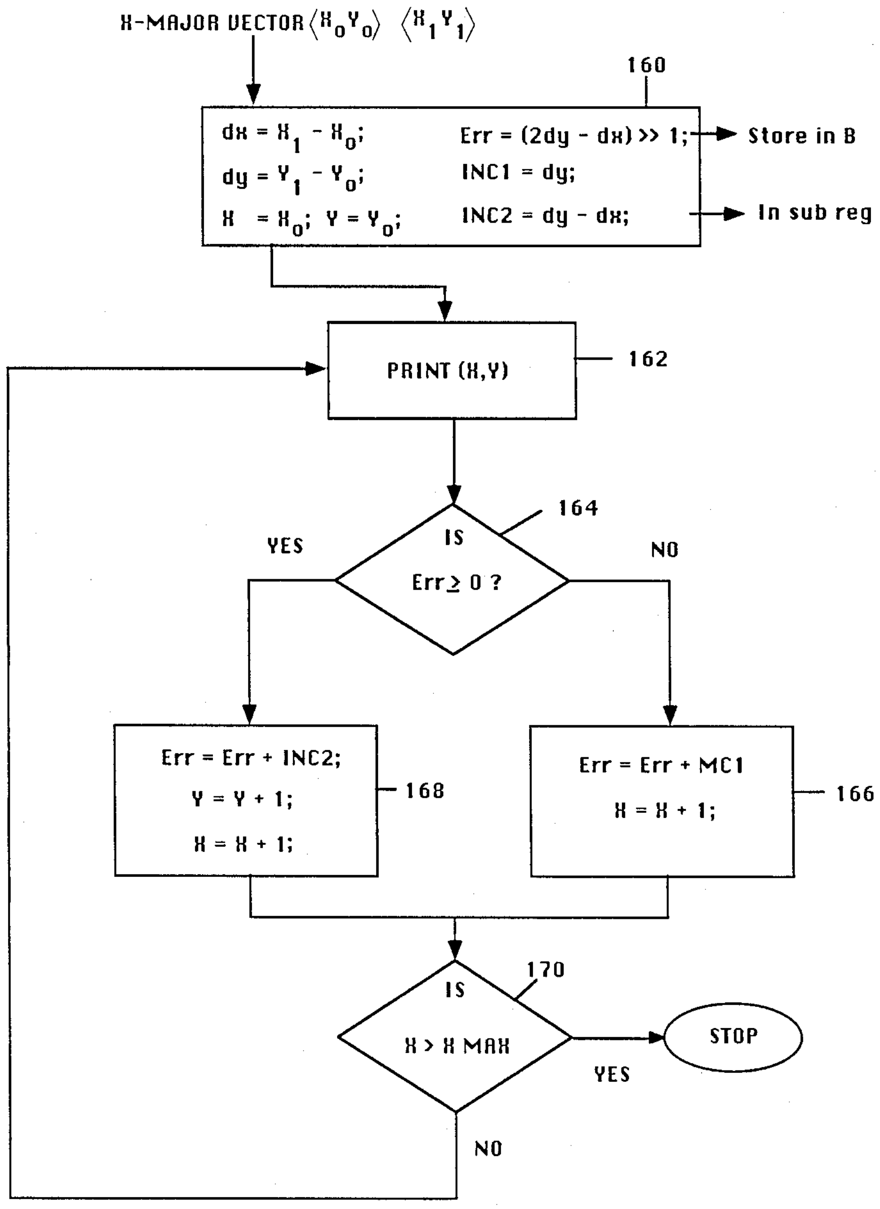
FIG. 5 is a flow chart illustrating a sequence of operations of the circuit of FIG. 4.

The above-described functions of the AFDU circuit pertain to the drawing of curves. FIG. 4 shows a simplified circuit diagram of the X AFDU chip 12 (shown in FIG. 3) illustrating only the components which are used for drawing vectors. FIG. 5 is a flow chart illustrating the operation of the circuitry shown in FIG. 4 and performing the example operation of drawing an x major vector using the Bresenham algorithm which is well known in the art.

When the rendering of a vector is initiated, the Bresenham algorithm parameters dx (the change in x), dy (the change in y), Err (the Bresenham error term), Inc 1 (a first increment), and Inc 2 (a second increment), which will later be discussed more fully with references to FIG. 5, are calculated by the CPU 9. The CPU 9 loads registers 34, 38, and 50 with Inc 1, Inc 2, and Err respectively. The CPU 9 also loads register 72 with vector endpoint value $x_0$ and loads the c register 62 with the value 0. The operation of the circuitry of FIG. 4 in the rendering of an x-major vector in conjunction with the flow diagram of FIG. 5, will now be explained.

A conditional circuit 64 outputs a 1 bit whenever the sign bits of register 50 and 62 are the same. Therefore, circuit 64 will provide a 1 input to adder 69 only when register 50 and 62 have the same sign. As stated, since register 62 is loaded with a zero at initialization time its sign is always 0. As such, circuit 64 will output a 1 to adder 66 whenever the sign bit from register 50 is zero (i.e., the Err is greater than zero). When the rendering of a vector is initiated, the CPU 9 commands the pixel filter 30 to assert a control signal to the AFDU circuits s that multiplexor 44 is control to the sign bit output of register 50. When the sign bit of register 50 is 0, multiplexor 44 then channels through the output of register 38. When the sign bit of register 50 is 1, multiplexor 44 selects the output of register 34.

Turning now to FIG. 5, the Bresenham parameters for a vector between beginning and ending curve coordinates $x_0$, $y_0$ and $x_1$, $y_1$ are initialized by CPU 9, as listed in block 160 of FIG. 5. The error term (Err) is calculated by the equation $Err=(2dy-dx)>>1$[where '>>1' means shift right by one bit] wherein $dx=x_1-x_0$ and $dy=y_1-y_0$. In block 162, the pixel having the current x and y coordinates (x is stored in register 72 of FIG. 4 and y is stored in the corresponding register of the Y AFDU circuit 14) is written on the CRT display. The flow then proceeds to step 164, wherein it is determined whether or not the Err (the value in register 50) is greater than 0.

If the error is greater than or equal to 0, the sign bit of register 50 is also 0 and the flow then proceeds to step 168 wherein Err is updated by adding Inc 2 to the previously calculated Err. The sign bit of register 50 controls multiplexor 44 such that the Inc 2 (input at multiplexor 44 which is stored in register 38) is selected then clocked through adder/subtracter 45 into register 50 whenever the sign bit of register 50 is zero. In block 168 the x and y coordinates are updated in the X and Y AFDU circuits by adding 1 to the contents of register 72 in X AFDU 12 and the corresponding register in Y AFDU circuit 14. As described above, this addition is performed by adder 66 which adds the output of circuit 64 to the previous contents of register 72 only when the sign bit of register 62 is equal to the sign bit of register 50.

On the other hand, if the Err is less than 0, the flow then proceeds to step 166, wherein the Err is adjusted to be equal to the previously calculated Err (stored in register 50) plus Inc 1 (stored in register 34) and x is incremented by one [Note: In this example operation, the y coordinate is not incremented in step 166 because the adder in the Y AFDU circuit 14 corresponding to adder 66 adds the output of circuit 64 (which is 0) to the contents of the register in Y AFDU circuit 14 corresponding to register 72.]

Inc 2, which is stored in register 38, is selected by multiplexor 44 and added to the contents of register 50 by adder 45 whenever the Err is greater or equal to 0. When the sign bit of register 50 is positive, adder 66 adds the output of circuit 64 to the contents of register 72 and clocks it through multiplexor 70 into register 72. The flow completes at step 170 when x is greater than $x_1$.

The above described circuitry of FIG. 4 also permits the rendering of a three-dimensional vector. For example where dz>dx>dy such that the z axis is the major axis and the x axis is a minor axis, the initialization of appropriate registers takes place in accordance with the following conditions:

The residual of z, herein termed "RESZ" is set to equal the integer portion of |dz|/|dx|;

The remainder of z, herein termed rem Z is set to equal the remainder of |dz|/|dx|;

The contents of the c′ register of the Z AFDU circuit, (termed herein as "reg cz")=the complement of RESZ (Note: the complement of z is used in this case because the value of z in the example operation herein described decreases as the vector is rendered);

The z Bresenham error term, termed herein as "ERRZ"=(2*remZ−dx)>>1 (where '>>1' denotes a right shift by 1 bit);

Increment 1 for the Z AFDU circuit ("1NCR1Z")=remZ;

incr2Z=remZ−|dx|;

The contents of the 'd register of the Z AFDU circuit is set to equal the initial value of z at the starting point of the vector being rendered.

The residual of y, "RESY"=the integer portion of |dy|/|dx| (Note: RESY is 0 in the example operation herein described because dy<dx).

The remainder of y, "remY"=the integer remainder of |dy|/|dx| (Note: rem y is dy in the example operation herein described because dy<dx).

The contents of the c′ register of the Y AFDU circuit=RESY (Note: In the example operation herein described y is not complemented because y increases as the vector is rendered).

The y Bresenham error, "ERRY"=(2* remY−dx)>>1 (wherein '>>1' means shift right by 1 bit);

incr1Y=remY;

incr2Y=remY−|dx|;

The contents of the 'd register of the Y AFDU circuit is set to equal the initial value of y at the starting point of the vector being rendered.

The results of the above stated conditions are then loaded into the corresponding Z and Y AFDU circuits. The ERR, incr1, incr2 and c′ register 62 of the X AFDU circuit are set to 0 and the d′ register 72 of the X AFDU circuit is loaded with the initial value of x at the starting point of the vector being rendered.

During each step in the rendering of the vector, the c′ register of each AFDU circuit is added to the corresponding d′ register. An additional carry bit is also added to the appropriate d′ register if the sign bit of the error and the sign bit of the c′ register have the same value (termed herein as the 'carry condition').

It is important to note in the example operation herein described that a carry condition always presents a 1 in the X AFDU circuit and therefor coordinate value x in the example operation herein described, will always be incremented by 1. The carry condition in the Y AFDU circuit will present a 1 when the Bresenham error is positive. In the situation when the Bresenham error in the Z AFDU circuit is less than zero, the carry condition presents a 1 because the sign of the c′ register therein is 1. The sign of the c′ reg in the Z AFDU is 1 since it is loaded with the complement of RESZ. Since the carry condition in the Z AFDU circuit is 1, -RESZ is added to the d′ register of the Z AFDU circuit. When the sign of the error is 0, the carry condition is 0 and -RESZ-1 is added to the d′ register of the Z AFDU circuit.

From the above example operation it will be appreciated that once the first axis is chosen the other axis may be computed using the above described method regardless of whether the other axes are being rendered in the increasing or decreasing direction, and regardless of whether the change along the other axis is greater than or less than the change along the first axis.

In view of the above discussion, it will therefore be appreciated that, when drawing vectors, the AFDU circuit provides a unique method for accurately implementing the Bresenham algorithm, which algorithm is well known in the art. It should also be appreciated in view of the above discussion that with appropriate initialization, the AFDU circuit may also implement the well known generalized version of the Bresenham algorithm which calculates the closest pixel to an ideal line in between the beginning and ending points, yet generates only one pixel location x, y for each unit increment in y. These generalized versions of the Bresenham algorithm are widely used for incrementally stepping along the edge of a polygon in scanline order and in anti-aliasing vector techniques. (See Dan Field, "Incremental Linear Interpolation," *ACM Transactions on Graphics,* Vol. 4, No. 1, January 1985; Akira Fujimoto and Ko Iwata, "Jag Free Images on a Raster CRT," *Computer Graphics Theory and Applications,* edited by Tosiyasu Kunii, published by Springer Verlag, 1983.)

In FIG. 7 there is shown an exploded view of the pixel filter 30 of FIG. 1. It is important to note that when drawing vectors, the pixel filter 30 transfers control of the AFDU circuits to perform the Bresenham algorithm, as previously described with reference to FIG. 4. In this case the l/w circuit 18 and the W AFDU 10 are not used. However, when drawing curves, pixel filter 30 controls the X Y, Z and W AFDU circuits 10, 12, 14 and 16 as previously described with respect to FIG. 3 to perform adjustments and forward steps.

Registers 102, 103, 104, 105 and 106 of FIG. 7 store coordinate values $x_n$ to $x_{n+4}$ which are supplied thereto by X AFDU circuit 12 and multiplier 20) (of FIG. 1) in five consecutive previous clock cycles. Similarly, y registers 120, 121, 122, 123 and 124 store y values $y_n$ to $y_{n+4}$. Likewise, register 134, 135, 136, 137 and 138 store z value $z_n$ to $z_{n+4}$. Registers 148, 149, 152, 154 and 158, as well as adder 156, and comparator 144, also operate in conjunction with the afore-described components, as will later be discussed.

Register 102–106 store, sequentially, each x coordinate supplied thereto by the X AFDU circuit 12 such that $x_{n+4}$ is the most recently calculated coordinate. At each clock cycle comparator 94 compares the value $x_{n+3}$ in register 105 with $x_{n+4}$ in register 106, and comparator 112 compares the value $y_{n+3}$ in register 123 with $y_{n+4}$ in register 124. If the absolute value of $x_{n+4}-x_{n+3}$ and the absolute value of $y_{n+4}-y_{n+3}$ are both less than 0.5 of a single pixel increment, the controller 92 sends a control signal to all four AFDU circuits instructing the same to increase the step size (adjust up) as previously described with respect to FIGS. 1, 2 and 3. If the absolute value of $x_{n+4}-x_{n+3}$ is greater than 1 or the absolute value of $y_{n+4}-y_{n+3}$ is greater than 1, the controller then asserts a control signal at all four AFDU circuits which instruct the same to decrease the step size (adjust down), also as previously described with reference to FIGS. 1, 2 and 3.

Values $z_{n+4}$ and $z_{n+3}$ stored in registers 138 and 137 are not used to determine whether or not the step size should be adjusted upwardly or downwardly because the x and y coordinates sufficiently define a pixel location on a CRT display. However, registers 138 and 137 function as delay buffers so that values $z_{n+2}$, $z_{n+1}$ and $z_n$ (which are stored, respectively, in registers 136–134) will correspond to the values of $y_{n+2}$, $y_{n+1}$ and $y_n$ (stored in, respectively, 122, 121, and 120) and to the values of $x_{n+2}$, $x_{n+1}$ and $x_n$ (stored in registers 104, 103 and 102).

Alternatively, if the absolute value of $x_{n+4}-x_{n+3}$ and the absolute value of $y_{n+4}-y_{n+3}$ are both between 0.5 and 1.0 pixel units, then the comparators 94 and 112 instruct control circuit 92 to instruct all four AFDU circuits to perform a forward step operation as previously described.

It is important to note that all four AFDU circuits 10, 12, 14 and 16 of FIG. 1 are adjusted upwardly, downwardly, or forwardly in synchronicity by pixel filter 30.

Elimination of redundant pixels in a displayed image will now be described. Comparator 96 compares the value $x_{n+2}$ which is stored in register 104, with the $x_{n+1}$ value stored in register 103. Comparator 114 compares the value $y_{n+2}$ in register 122 with the value $y_{n+1}$ in register 121. If $x_{n+2}=x_{n+1}$ and $y_{n+2}=y_{n+1}$, comparators 96 and 114 assert signals at control circuit 92 which, in turn, output an invalid pixel bit to paint section 150, such that paint section 150 invalidates the modifications corresponding to the pixel having the coordinates corresponding to $x_{n+1}$ and $y_{n+1}$.

Elimination of "elbows" (see FIGS. 6 and 6a) in a displayed image will now be disclosed. Comparator 96 compares the integer part of the value $x_{n+2}$ in register 104 with the integer part of the value $x_n$ in register 102 and the comparator 114 compares the integer part of the value $y_{n+2}$ in register 122 with the integer part of the value $y_n$ in register 120. If the absolute value of $x_{n+2}-x_n$ is equal to 1 and the absolute value of $y_{n+2}-y_n$ is equal to 1 then comparators 96 and 114 assert signals at control circuit 92, which, in turn, outputs an invalid pixel bit to paint section 150, such that paint section 150 will not paint the pixel whose coordinates correspond to $x_{n+1}$ and $y_{n+1}$.

Defining a clipping region in the displayed screen will now be described. Preloaded into registers 100, 118, 132 and 146 are, respectively, x minimum and x maximum values, y minimum and y maximum values, z minimum and z maximum values and t minimum and t maximum values. Comparator 9 is coupled to register 103 and compares the value $x_{n+1}$ with x maximum and x minimum. If $x_{n+1}$ is not within x minimum and x maximum value, comparator 98 asserts a control signal to control circuit 92, which, in turn, instructs paint section 150 to invalidate the modifications corresponding to the pixel defined by the coordinate $x_{n+1}$, $y_{n+1}$, $z_{n+1}$, $t_{n+1}$ which pixel is outside of the window defined by x min and x max values stored in register 100. The same actions occur with respect to y minimum and maximum register 118, z minimum and z maximum register 132 and t minimum and maximum register 146. Accordingly, if $y_{n+1}$, which is stored in register 121, is less than the y minimum value or greater than the y maximum value stored in register 118, comparator 116 initiates a control signal to control circuit 92, which ultimately instructs the paint section 150 not to paint the pixel ($x_{n+1}$, $y_{n+1}$, $z_{n+1}$, $t_{n+1}$) Similarly, if $z_{n+1}$, which is stored in register 135, is less than a z minimum value or greater than the z maximum value stored in register 132, a comparator 130 asserts a control signal at control circuit 92, which in turn instructs the paint section 150 not to paint the pixel ($x_{n+1}$, $y_{n+1}$, $z_{n+1}$, $t_{n+1}$). Finally, if $t_{n+1}$, which is stored in register 150, is less than t minimum or greater than t maximum stored in register 146, comparator 144 asserts a signal at control circuit 92, which in turn instructs paint section 150 not to paint the pixel ($x_{n+1}$, $y_{n+1}$, $z_{n+1}$, $t_{n+1}$). The minimum and maximum values stored in registers 100, 118, 132 and 146 are preloaded by CPU 9 in order to define a desired "window" or clipping region on the display screen.

A pre-computed value dt which corresponds to the a, b, c, and d parameters of the curve being rendered (which are stored in register 34, 50, 62 and 72) is calculated by the CPU 9 at initialization time and loaded into register 158. t is given a value equal to 0 at initialization time. Since dt represents the parameter step size, it must be adjusted upwardly or downwardly in order to coincide with the adjustments to the X, Y, Z and W AFDU circuits which were previously described with reference to FIGS. 1 and 3. Accordingly, dt is shifted one bit to the left to obtain 2dt at multiplexor 153 when an adjust up is required in order to correspond dt to an adjust up in the AFDU circuits. Similarly, dt is shifted one bit to the right in order to obtain dt/2 at multiplexor 153. 2dt or dt/2 is selected by appropriate control signals asserted by control circuit 92 at multiplexor 153 in order to correspond dt to the adjustments made to the X, Y, Z and W AFDU circuits. The value of dt is outputted to adder 156 which adds t thereto and stores the results thereof in register 154. The output register 154 is delayed several clock cycles in delay register 152 so that $t_{n+1}$ and $t_n$ which are stored respectively, in registers 159 and 148 coincide in time with values $x_{n+1}$, and $y_{n+1}$, $y_n$, $z_{n+1}$, and $z_n$ so that the value $t_{n=1}$ will be an appropriate value for comparator 144 to compare against values $t_{min}$ and $t_{max}$.

It will be appreciated that the above-described invention may be embodied in other specific forms without departing from the spirit or essential characteristics thereof. The present embodiments are, therefore, to be considered in all aspects as illustrative and not restrictive, the scope of the invention being indicated by the appended claims rather than by the foregoing description, and all changes which come within the meaning and range of equivalency are, therefore, intended to be embraced therein.

We claim:

1. An apparatus for rendering curves, curved surfaces and vectors defined by major and minor coordinates on a display device having a plurality of display elements, said apparatus comprising:

means for rendering curves and curved surfaces using adaptive forward differencing;

means for rendering vectors comprising:

means for receiving Bresenham parameters defining an ideal vector between beginning and ending display element coordinates $x_0$, $y_0$ and $x_1$,$y_1$;

means for initializing a Bresenham error to be the change in the major coordinate of the ideal vector multiplied by one-half, plus the change in the minor coordinate of the ideal vector;

means for displaying instantaneous coordinates of said vector being rendered;

means for continuously updating the Bresenham error between each coordinate of said ideal vector and corresponding coordinate of said vector being rendered comprising:

means for determining whether or not said Bresenham error is greater than or equal to zero at each one of said instantaneous coordinates;

if said Bresenham error is greater than or equal to zero, means for updating said Bresenham error by adding a first predetermined increment to said error;

if said Bresenham error is less than zero, means for updating said Bresenham error by adding a second predetermined increment to said Bresenham error;

if said Bresenham error is greater than or equal to zero, means for adjusting the incrementation of said vector being rendered by incrementing said major and minor coordinates of the instantaneous coordinates by a predetermined value;

if said Bresenham error is less than zero, means for incrementing said major coordinate of the instantaneous coordinates by the predetermined value.

2. A method for rendering curves, curved surfaces and vectors defined by major and minor coordinates on a display device having a plurality of display elements, said method comprising the steps of:

receiving curve, curved surface or vector data to be rendered, said vector data comprising Bresenham parameters defining an ideal vector between beginning and ending display element coordinates $x_0$, $y_0$ and $x_1$, $y_1$;

rendering the curves and curve surfaces using adaptive forward differencing;

rendering the vectors employing a form of the Bresenham algorithm, said method comprising the steps of:

initializing a Bresenham error to be the change of the major coordinate of the ideal vector multiplied by one-half, plus the change in the minor coordinate of the ideal vector;

displaying instantaneous coordinates of said vector being rendered;

continuously updating the Bresenham error between each coordinate of said ideal vector and corresponding coordinate of said vector being rendered comprising the steps of:

determining whether or not said Bresenham error is greater than or equal to zero at each one of said instantaneous coordinates;

if said Bresenham error is greater than or equal to zero, updating said Bresenham error by adding a first predetermined increment to said error;

if said Bresenham error is less than zero, updating said Bresenham error by adding a second predetermined increment to said Bresenham error;

if said Bresenham error is greater than or equal to zero, adjusting one incrementation of said vector being rendered by incrementing said major and minor coordinates of the instantaneous coordinates by a predetermined value;

if said Bresenham error is less than zero, means for incrementing said major coordinate of the instantaneous coordinates by the predetermined value.

* * * * *

UNITED STATES PATENT AND TRADEMARK OFFICE
CERTIFICATE OF CORRECTION

PATENT NO. : 4,855,935

DATED : 8/8/89

INVENTOR(S) : Lien et al.

It is certified that error in the above-identified patent and that said Letters Patent is hereby corrected as shown below:

| | | |
|---|---|---|
| col. 05, line 56 | delete "ar" | insert --are-- |
| col. 08, line 12 | delete "ar" | insert --are-- |
| col. 10, line 21 | delete "o" | insert --of-- |
| col. 10, line 53 | delete "s" | insert --so-- |
| col. 14, line 17 | delete "9" | insert --98-- |

Signed and Sealed this

Twenty-third Day of April, 1991

*Attest:*

HARRY F. MANBECK, JR.

*Attesting Officer*

*Commissioner of Patents and Trademarks*